Patented Apr. 10, 1928.

1,665,787

UNITED STATES PATENT OFFICE.

TORU IWADARE, OF TOKYO, JAPAN.

METHOD OF MANUFACTURING A NEW SYPHILIS REMEDY FROM DIHYDROXY-DIAMINO-ARSENO-BENZENE-MONOMETHYLENE SULPHONIC ACID.

No Drawing. Application filed October 8, 1926, Serial No. 140,424, and in Japan December 14, 1925.

The present invention relates to a method of manufacturing a new compound

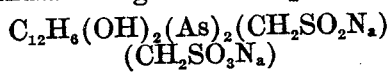

by causing formaldehyde and sodium-bisulphite to act upon neoarsphenamine, namely, acidified sodium-dihydroxy-diamino-arseno-benzene - monomethylene - sulphonate. The object of the invention is to obtain by simple means and at a small cost a syphilis remedy of sure effect which produces very little secondary reaction.

This invention consists in causing formaldehyde and sodium-bisulphite to act upon neoarsphenamine in acid condition and thus form a new remedy which is more stable than neoarsphenamine, which does not cause any pain when injected into muscles and which is quite sure in its effect against syphilis.

The following is a manner of carrying this invention into practice:—

Dissolve one gram molecule of neoarsphenamine in five times the quantity of water by weight and add the proper quantity of hydrochloric acid thereto. Then, add thereto one gram molecule of formaldehyde and two gram molecules of sodium-bisulphite; and the precipitates at first produced will gradually be all dissolved. In the solution thus produced, a new compound called neo-arsphenamine-formaldehyde-sodium-bisulphite will be formed according to the following equation:—

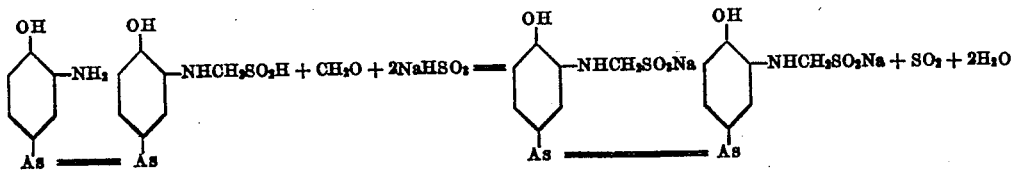

Pour this solution into alcohol or ether-alcohol. Then. separate therefrom the precipitates thus produced by filtration and dry same. The product thus obtained is a yellowish brown powder easily soluble in water and suitable for injection not only intravenously, but also intramuscularly without causing any pain. Furthermore, it is less toxic than neoarsphenamine, and both the powder and the aqueous solution are more stable than neoarsphenamine. Above all, it being possible to manufacture the present remedy of superior quality from neoarsphenamine of poor quality, it is very economical.

I claim:

A method of manufacturing a new syphilis remedy, comprising causing formaldehyde and sodium-bisulphite to act upon dihydroxy-diamino-arseno-benzene-monomethylene sulphonic acid.

In testimony whereof I have affixed my signature.

TORU IWADARE.